(12) United States Patent
Anegawa

(10) Patent No.: US 11,400,652 B2
(45) Date of Patent: Aug. 2, 2022

(54) THREE-DIMENSIONAL SHAPING DEVICE AND METHOD FOR MANUFACTURING THREE-DIMENSIONAL SHAPED OBJECT

(71) Applicant: SEIKO EPSON CORPORATION, Tokyo (JP)

(72) Inventor: Kenta Anegawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/015,927

(22) Filed: Sep. 9, 2020

(65) Prior Publication Data

US 2021/0078256 A1    Mar. 18, 2021

(30) Foreign Application Priority Data

Sep. 12, 2019 (JP) .............................. JP2019-165803

(51) Int. Cl.
| | |
|---|---|
| *B29C 64/295* | (2017.01) |
| *B33Y 10/00* | (2015.01) |
| *B33Y 30/00* | (2015.01) |
| *B29C 64/112* | (2017.01) |
| *B29C 64/209* | (2017.01) |

(52) U.S. Cl.
CPC .......... *B29C 64/295* (2017.08); *B29C 64/112* (2017.08); *B29C 64/209* (2017.08); *B33Y 10/00* (2014.12); *B33Y 30/00* (2014.12)

(58) Field of Classification Search
CPC ... B29C 64/112; B29C 64/295; B29C 64/209; B33Y 10/00; B33Y 30/00; B22F 10/00; B22F 12/00
See application file for complete search history.

(56) References Cited

U.S. PATENT DOCUMENTS

| | | | |
|---|---|---|---|
| 2017/0157845 A1 | 6/2017 | Bihari et al. | |
| 2017/0334137 A1* | 11/2017 | Nystrom | B29C 64/393 |
| 2018/0326658 A1* | 11/2018 | Saito | B29C 64/245 |

FOREIGN PATENT DOCUMENTS

| | | |
|---|---|---|
| CN | 108859101 | 11/2018 |
| EP | 3401081 | 11/2018 |
| JP | 2017-523063 | 8/2017 |
| JP | 2018-192624 | 12/2018 |
| KR | 2019-0054694 | 5/2019 |
| WO | 2019-110844 | 6/2019 |

* cited by examiner

*Primary Examiner* — Joseph S Del Sole
*Assistant Examiner* — Jamel M Nelson
(74) *Attorney, Agent, or Firm* — Workman Nydegger

(57) ABSTRACT

A three-dimensional shaping device includes: a melting unit configured to plasticize a material into a shaping material; a nozzle configured to discharge the shaping material toward a stage; a moving mechanism configured to change a relative position between the nozzle and the stage; a control unit configured to control the moving mechanism; and an air blowing unit having a plurality of air outlets that are disposed around the nozzle and through which warm air is blown toward the shaping material discharged from the nozzle.

9 Claims, 7 Drawing Sheets

THREE-DIMENSIONAL SHAPING DEVICE AND METHOD FOR MANUFACTURING THREE-DIMENSIONAL SHAPED OBJECT

The present application is based on, and claims priority from JP Application Serial Number 2019-165803, filed Sep. 12, 2019, the disclosure of which is hereby incorporated by reference herein in its entirety.

BACKGROUND

1. Technical Field

The present disclosure relates to a three-dimensional shaping device and a method for manufacturing a three-dimensional shaped object.

2. Related Art

With respect to a three-dimensional shaping device, for example, JP-T-2017-523063 discloses a device in which an existing layer is heated by an energy source coupled to a head via a support arm, and a subsequent layer is stacked on the heated existing layer, so that adhesion between the existing layer and the subsequent layer is improved.

In the device described in JP-T-2017-523063, it is necessary to heat a position in front of a nozzle in order to stack the subsequent layer on the heated existing layer. Therefore, every time a moving direction of the nozzle is changed, it may be necessary to move the energy source to a position where the front of the nozzle can be heated, and complicated control is required.

SUMMARY

According to one aspect of the present disclosure, a three-dimensional shaping device is provided. The three-dimensional shaping device includes: a melting unit configured to plasticize a material into a shaping material; a nozzle configured to discharge the shaping material toward a stage; a moving mechanism configured to change a relative position between the nozzle and the stage; a control unit configured to control the moving mechanism; and an air blowing unit having a plurality of air outlets that are disposed around the nozzle and through which warm air is blown toward the shaping material discharged from the nozzle.

DESCRIPTION OF EXEMPLARY EMBODIMENTS

A. First Embodiment

Figure 1:
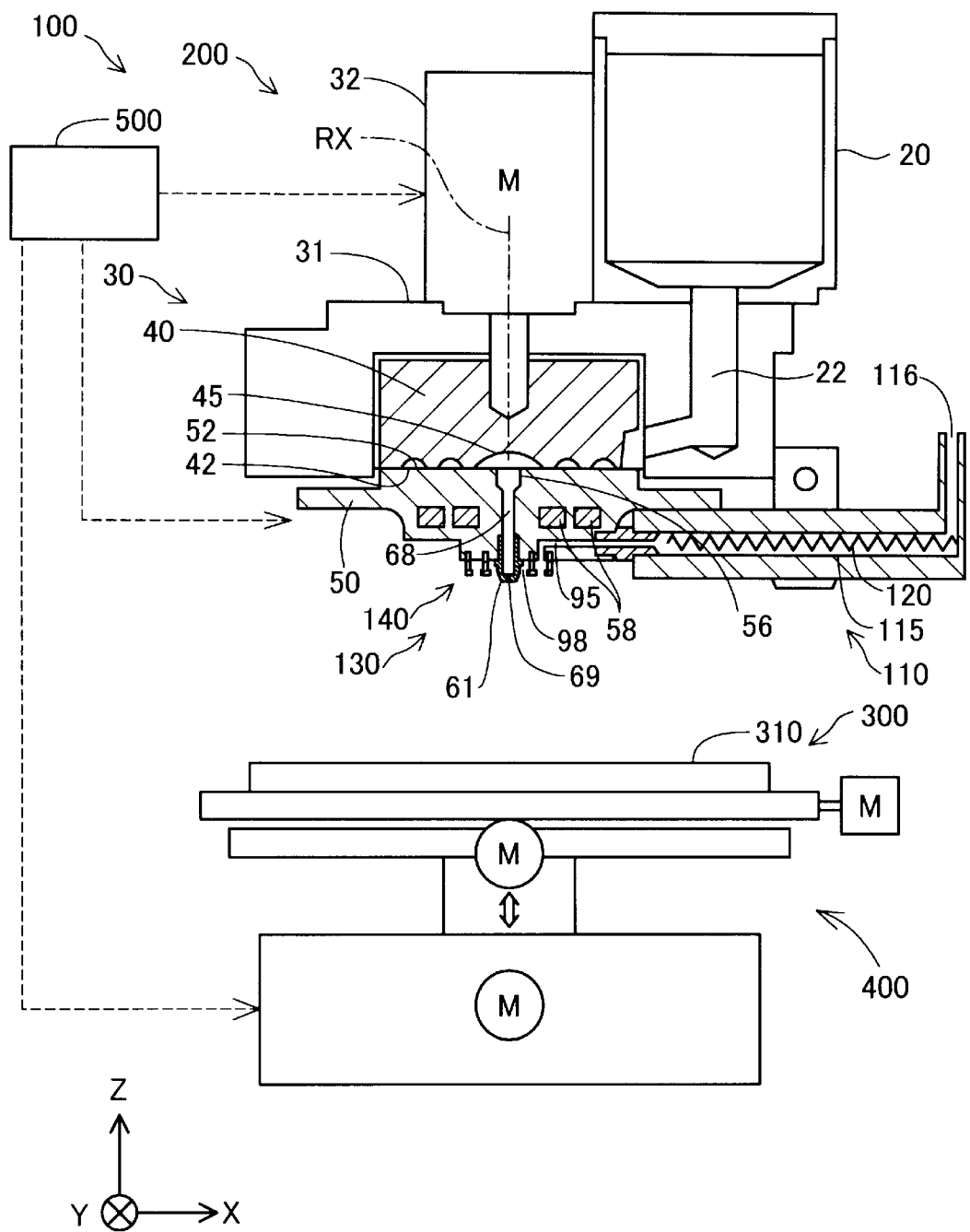
FIG. 1 is an explanatory diagram showing a schematic configuration of a three-dimensional shaping device according to a first embodiment.

FIG. 1 is a diagram showing a schematic configuration of a three-dimensional shaping device 100. In FIG. 1, arrows along X, Y, and Z directions which are orthogonal to each other are shown. The X direction and the Y direction are directions along a horizontal direction and the Z direction is a direction along a vertical direction. In other figures, arrows along the X, Y, and Z directions are appropriately shown. The X, Y, Z directions in FIG. 1 and the X, Y, Z directions in other figures represent the same direction.

The three-dimensional shaping device 100 includes a shaping unit 200, a stage 300, a moving mechanism 400, and a control unit 500. In the three-dimensional shaping device 100, under control of the control unit 500, a shaping material is discharged from a nozzle 61 toward a shaping surface 310 on the stage 300, and meanwhile a relative position between the nozzle 61 provided on the shaping unit 200 and the shaping surface 310 is changed by driving the drive unit 400, so as to shape a three-dimensional shaped object in which the shaping material is stacked on the shaping surface 310. A detailed configuration of the shaping unit 200 will be described later. The shaping unit 200 is sometimes referred to as a head.

The moving mechanism 400 changes the relative position between the nozzle 61 and the shaping surface 310 as described above. In the present embodiment, the moving mechanism 400 supports the stage 300, and changes the relative position between the nozzle 61 and the shaping surface 310 by moving the stage 300 with respect to the shaping unit 200. The change in the relative position of the nozzle 61 with respect to the shaping surface 310 may be referred to as movement of the nozzle 61. Further, a direction in which the relative position of the nozzle 61 with respect to the shaping surface 310 changes may be referred to as a moving direction of the nozzle 61. In the present embodiment, for example, moving the stage 300 in a +X direction can be rephrased as moving the nozzle 61 in a −X direction. Further, the moving direction of the nozzle 61 at this time is the −X direction.

The moving mechanism 400 according to the present embodiment includes a three-axis positioner that moves the stage 300 in three axial directions of the X, Y, and Z directions by drive forces of three motors. Each motor is driven under the control of the control unit 500. The moving mechanism 400 may be configured to change the relative position between the nozzle 61 and the shaping surface 310 by moving the shaping unit 200 without moving the stage 300. In addition, the moving mechanism 400 may be configured to change the relative position between the nozzle 61 and the shaping surface 310 by moving both the stage 300 and the shaping unit 200.

The control unit 500 is implemented by a computer, and includes one or more processors, a memory, and an input and output interface for inputting and outputting signals from and to an outside. The processor executes a predetermined program stored in the memory to implement shaping processing for shaping the three-dimensional shaped object. In the shaping processing, the control unit 500 appropriately controls the shaping unit 200 and the moving mechanism 400. Some or all of functions of the control unit 500 may be implemented by a circuit.

The shaping unit 200 includes a material supply unit 20 that is a supply source of a material before being converted to the shaping material, s melting unit 30 that melts the material into the shaping material, the nozzle 61 that discharges the shaping material supplied from the melting unit 30 toward the shaping surface 310, a warm air generating unit 110 that generates warm air, and an air blowing unit 130 having a plurality of air outlets 140 through which the warm air generated by the warm air generating unit 110 is blown out.

The material supply unit 20 supplies the material for generating the shaping material to the melting unit 30. The material supply unit 20 is implemented by, for example, a hopper that accommodates the material. The material supply unit 20 is coupled to the melting unit 30 via a communication path 22. The material is fed to the material supply unit 20 in a form of, for example, pellets or powder. Details of the material will be described later.

The melting unit 30 plasticizes the material supplied from the material supply unit 20 to generate the shaping material in the form of paste in which fluidity is exhibited, and guides the shaping material to the nozzle 61. The melting unit 30 includes a screw case 31, a drive motor 32, a flat screw 40, and a barrel 50. The flat screw 40 is also referred to as a "scroll". The barrel 50 is also referred to as a "screw facing unit". The melting unit 30 does not have to melt all kinds of substances constituting the shaping material. The melting unit 30 may convert the shaping material into a state having the fluidity as a whole by melting at least some kinds of the substances among the substances constituting the shaping material.

The flat screw 40 has a substantially columnar shape whose height along a central axis RX thereof is smaller than a diameter thereof. In this embodiment, the flat screw 40 is disposed such that the central axis RX thereof is parallel to the Z direction.

The flat screw 40 is accommodated in the screw case 31. An upper surface side of the flat screw 40 is coupled to the drive motor 32, and the flat screw 40 rotates about the central axis RX within the screw case 31 by a rotation drive force generated by the drive motor 32. The drive motor 32 is controlled and driven by the control unit 500.

A groove portion 42 is formed on a lower surface of the flat screw 40. The communication path 22 of the material supply unit 20 described above communicates with the groove portion 42 from a side surface of the flat screw 40.

The lower surface of the flat screw 40 faces an upper surface of the barrel 50. A space is formed between the groove portion 42 on the lower surface of the flat screw 40 and the upper surface of the barrel 50. The material is supplied from the material supply unit 20 to this space. Specific configurations of the flat screw 40 and the groove portion 42 will be described later.

A heater 58 for heating the material is embedded in the barrel 50. In the present embodiment, four rod-shaped heaters 58 are disposed along the Y direction. All of the heaters 58 are disposed below a screw facing surface 52. Temperatures of all of the heaters 58 are controlled by the control unit 500. The heater 58 may be referred to as a first heating unit.

A warm air supply flow path 95 is provided in the barrel 50. The warm air generated by the warm air generating unit 110, which will be described later, flows to the air blowing unit 130 via the warm air supply flow path 95. The warm air supply flow path 95 and the barrel 50 are heated by the heater 58.

The warm air refers to a gas flow in which an average value of outlet temperatures at the air outlets 140 for each air outlet 140 is 200° C. or higher. In order to enhance adhesive effect to an existing layer, a temperature of the warm air is preferably a temperature equal to or higher than a glass transition point of the shaping material, for example, 300° C. to 400° C. In order to reduce temperature variation among the air outlets 140, it is preferable that a flow rate of the warm air is large, that is, 20 L/m to 30 L/m.

The material supplied into the groove portion 42 of the flat screw 40 flows along the groove portion 42 by rotation of the flat screw 40 while being melted in the groove portion 42, and is guided to a central portion 45 of the flat screw 40 as the shaping material. The shaping material in the form of paste flowing into the central portion 45 is supplied to the nozzle 61 via a communication hole 56 provided at a center of the barrel 50.

The nozzle 61 is provided below the barrel 50. The nozzle 61 has a nozzle flow path 68 and a discharge port 69. The nozzle flow path 68 is a flow path provided in the nozzle 61, and one end thereof is coupled to the communication hole 56 in the barrel 50. The discharge port 69 is provided at an end of the nozzle flow path 68 that is not coupled to the communication hole 56, and is located below a lower surface of the barrel 50. In the present embodiment, an opening shape of the discharge port 69 is a circle. The shaping material flows into the nozzle flow path 68 from the communication hole 56 and is discharged from the discharge port 69. The opening shape of the discharge port 69 is not limited to the circle, and may be, for example, a square or a polygon other than the square.

The warm air generating unit 110 is coupled to the barrel 50 from the +X direction. The warm air generating unit 110 includes a gas pipe 115 and a heat generating unit 120.

The gas pipe 115 is a cylindrical pipe. An introduction port 116 for introducing gas into the gas pipe 115 is provided at one end of the gas pipe 115. An end of the gas pipe 115 opposite to the introduction port 116 is coupled to the warm air supply flow path 95 provided in the barrel 50. Although not shown, in the present embodiment, gas whose flow rate is adjusted is introduced into the gas pipe 115 from the introduction port 116. An air pump, for example, can be used to introduce the gas into the gas pipe 115. Further, the gas introduced into the gas pipe 115 may be another inert gas instead of air. For example, the gas may be nitrogen.

The heat generating unit 120 is a coil-shaped heating wire, and is provided inside the gas pipe 115. The gas introduced into the gas pipe 115 is heated by the heat generating unit 120 and flows into the warm air supply flow path 95.

Figure 2:
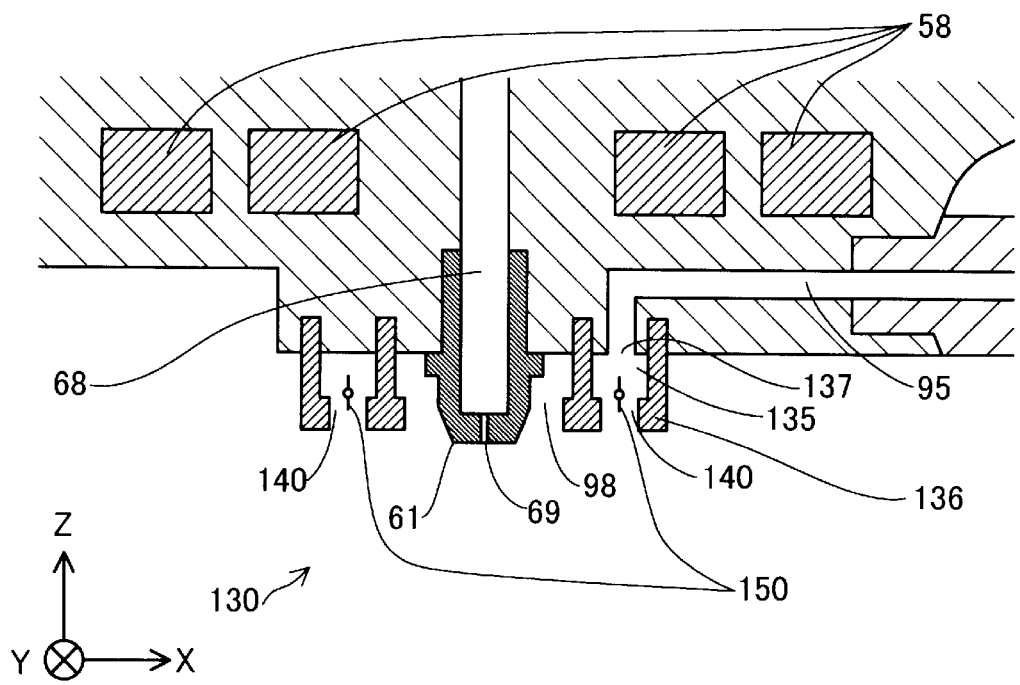
FIG. 2 is an explanatory diagram showing a schematic configuration of an air blowing unit according to the first embodiment.
Figure 3:
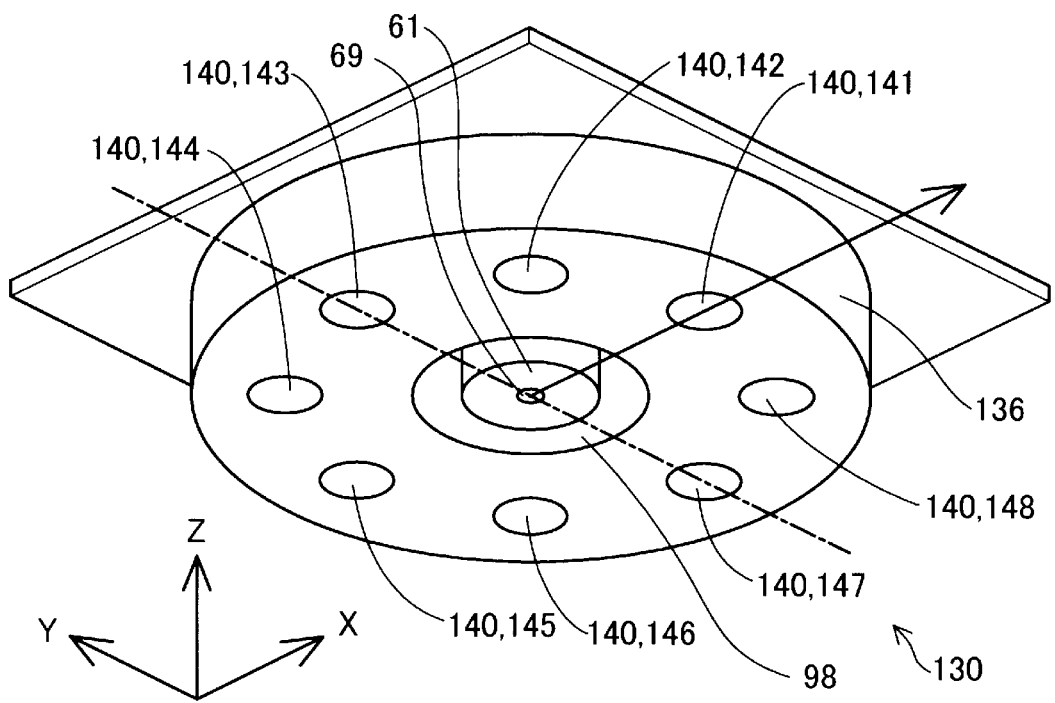
FIG. 3 is a schematic perspective view showing a configuration of a lower surface side of the air blowing unit.

FIG. 2 is a diagram showing a configuration of the air blowing unit 130. In addition, FIG. 3 is a schematic perspective view showing a configuration of a lower surface side of the air blowing unit 130. The air blowing unit 130 is provided below the barrel 50 and has a substantially columnar shape. The air blowing unit 130 includes an annular flow path 135, a warm air supply port 137, and the plurality of air outlets 140.

As shown in FIG. 2, the annular flow path 135 is an annular flow path formed with the nozzle 61 as a center and along an outer peripheral portion 136 of the air blowing unit 130. The annular flow path 135 is provided below the barrel 50. The warm air supply port 137 is provided above a flow path located on a side of the +X direction among the annular flow path 135. The warm air supply port 137 is a circular opening portion, and is coupled to the warm air supply flow path 95 provided in the barrel 50. The warm air supply port 137 supplies the warm air supplied from the warm air supply flow path 95 to the annular flow path 135. The annular flow path 135 supplies the warm air supplied from the warm air supply port 137 to the air outlet 140 that communicates with the annular flow path 135.

A heat insulating portion 98 is provided between the nozzle 61 and the annular flow path 135. The heat insulating portion 98 separates the nozzle 61 and the annular flow path 135 from each other, and air in the heat insulating portion 98 insulates heat between the nozzle 61 and the annular flow path 135 from each other. Glass wool or the like may be fixed to the heat insulating portion 98 as a heat insulating material.

The air outlets 140 are disposed around the nozzle 61. As shown in FIG. 3, in the present embodiment, eight air outlets 140 are disposed at regular intervals on a circumference with the nozzle 61 as the center. The air outlet 140 blows the warm air supplied from the annular flow path 135 toward the shaping material discharged from the nozzle 61 onto the shaping surface 310.

In addition, each air outlet 140 may be distinguished. A first air outlet 141 is provided at a position in the +X direction when viewed from the nozzle 61. Each of the air outlets 140 is counterclockwise provided with the nozzle 61 as the center, and in an order from the first air outlet 141, to a second air outlet 142, a third air outlet 143, a fourth air outlet 144, a fifth air outlet 145, a sixth air outlet 146, a seventh air outlet 147, and an eighth air outlet 148. The third air outlet 143 is provided at a position in the +Y direction when viewed from the nozzle 61, the fifth air outlet 145 is provided at a position in the –X position when viewed from the nozzle 61, and the seventh air outlet 147 is provided at a position in the –Y direction when viewed from the nozzle 61.

As shown in FIG. 2, each air outlet 140 is provided with an adjusting valve 150. Note that the adjusting valve 150 is not shown in FIG. 3. The adjusting valve 150 is a butterfly valve having a disc-shaped valve portion and a rotation shaft. By rotation of the adjusting valve 150, the air outlet 140 is opened and closed, and a blown air amount of the warm air blown from the air outlet 140 is adjusted. Further, the adjusting valves 150 are individually controlled by the control unit 500. That is, the adjusting valve 150 functions as a blown air amount adjusting mechanism capable of adjusting the blown air amount for each air outlet 140. It should be noted that when the adjusting valve 150 is parallel to the X direction, the blown air amount is 0, which is the minimum. Further, when the adjusting valve 150 is vertical to the X direction, the blown air amount becomes the maximum. In another embodiment, the blown air amount adjusting mechanism may be, for example, a shutter that opens and closes the air outlet 140 with one or a plurality of plate-shaped members.

Figure 4:
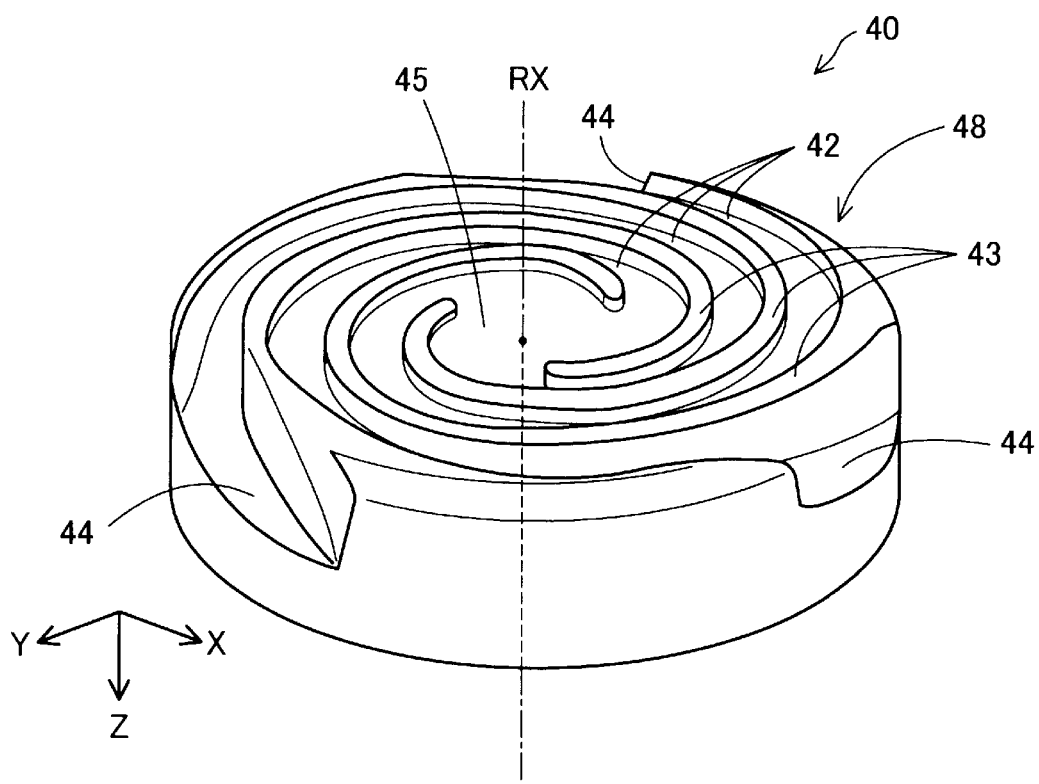
FIG. 4 is a schematic perspective view showing a configuration of a lower surface side of a flat screw.

FIG. 4 is a schematic perspective view showing a configuration of a lower surface side of the flat screw 40. In FIG. 4, a position of the central axis RX of the flat screw 40 is shown by a dashed line. The groove portion 42 is provided on the lower surface of the flat screw 40 facing the barrel 50. Hereinafter, the lower surface of the flat screw 40 is referred to as a "groove forming surface 48".

The central portion 45 of the groove forming surface 48 of the flat screw 40 is implemented as a recess portion to which one end of the groove portion 42 is coupled. The central portion 45 faces the communication hole 56 of the barrel 50. In the first embodiment, the central portion 45 intersects the central axis RX.

The groove portion 42 of the flat screw 40 forms a so-called scroll groove. The groove portion 42 extends from the central portion 45 toward an outer periphery of the flat screw 40 in a form of swirl so as to draw an arc. The groove portion 42 may extend spirally. The groove forming surface 48 is provided with ridge portions 43 that form side wall portions of the groove portion 42 and extend along each groove portion 42.

The groove portion 42 extends to a material inflow port 44 formed on the side surface of the flat screw 40. This material inflow port 44 is a portion that receives a material MR supplied via the communication path 22 of the material supply unit 20.

FIG. 4 shows an example of the flat screw 40 having three groove portions 42 and three ridge portions 43. The number of the groove portion 42 or the ridge portion 43 provided on the flat screw 40 is not limited to three. The flat screw 40 may be provided with only one groove portion 42, or may be provided with two or more groove portions 42. Any number of the ridge portions 43 may be provided in accordance with the number of the groove portions 42.

FIG. 4 shows an example of the flat screw 40 in which the material inflow ports 44 are formed at three places. The number of the material inflow ports 44 provided in the flat screw 40 is not limited to three. The flat screw 40 may be provided with the material inflow port 44 only at one place, or at two or more places.

Figure 5:
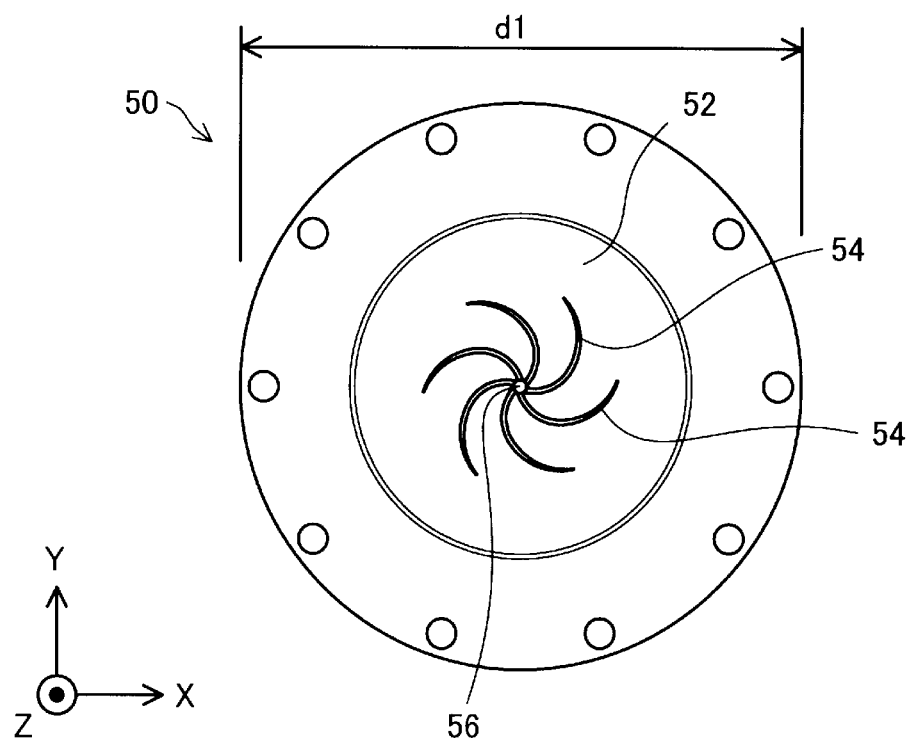
FIG. 5 is a schematic plan view showing a configuration of an upper surface side of a barrel.

FIG. 5 is a schematic plan view showing a configuration of an upper surface side of the barrel 50. The upper surface of the barrel 50 faces the groove forming surface 48 of the flat screw 40 as described above. Hereinafter, the upper surface of the barrel 50 is referred to as the "screw facing surface 52". The screw facing surface has a substantially circular shape with a diameter d1. The communication hole 56 for supplying the shaping material to the nozzle 61 is formed at a center of the screw facing surface 52.

A plurality of guide grooves 54, coupled to the communication hole 56 and extending in the form of swirl from the communication hole 56 towards an outer periphery, are formed on the screw facing surface 52. The plurality of guide grooves 54 have a function of guiding, to the communication hole 56, the shaping material flowing into the central portion 45 of the flat screw 40.

When the flat screw 40 rotates, the material supplied from the material inflow port 44 is guided to the groove portions 42 to move toward the central portion 45 while being heated in the groove portions 42. As the central portion 45 is closer to the material, the material is more melted and has increased flowability, and is converted into the shaping material. The shaping material concentrated in the central portion 45 flows out from the communication hole 56 to the nozzle 61 due to an internal pressure generated in the central portion 45.

Figure 6:
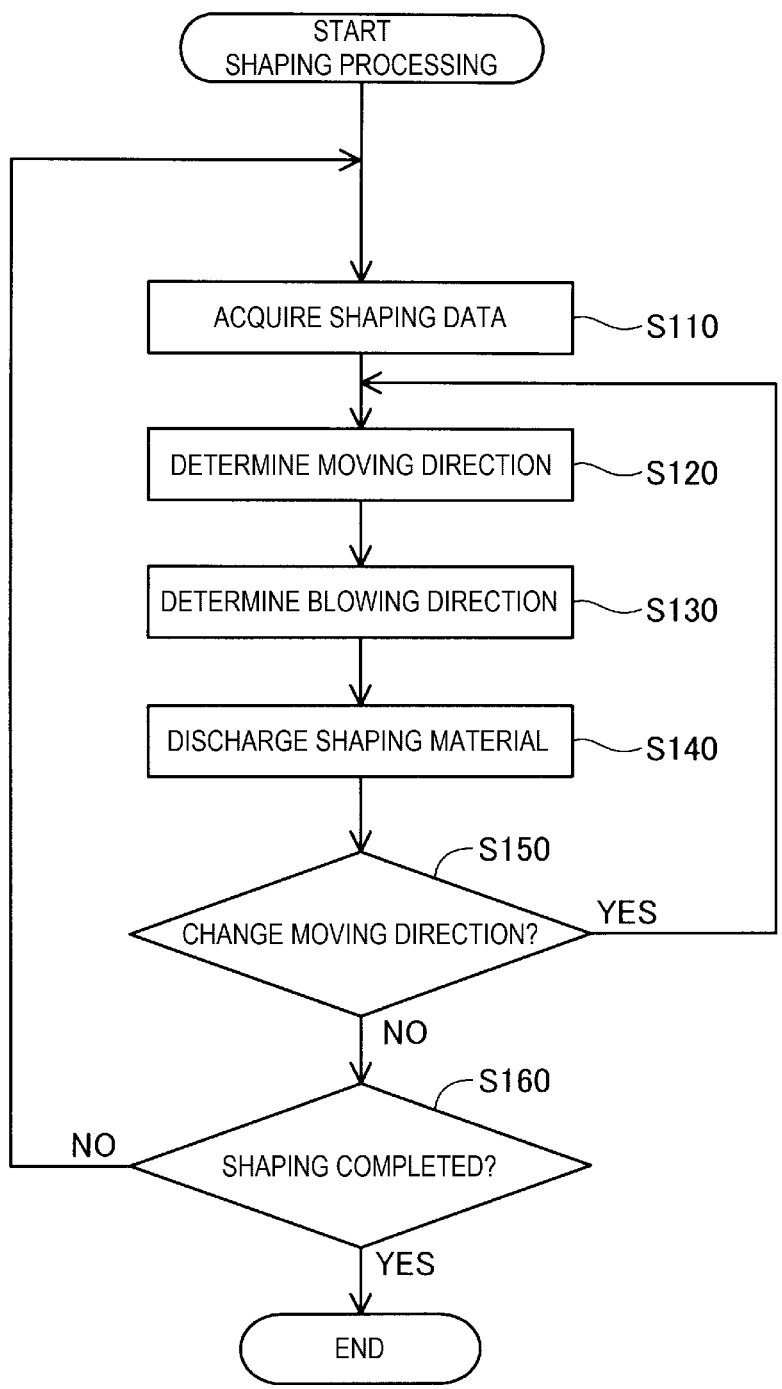
FIG. 6 is a process diagram showing a shaping processing of a three-dimensional shaped object according to the first embodiment.

FIG. 6 is a process diagram showing the shaping processing of the three-dimensional shaped object according to the first embodiment. In the present embodiment, this shaping processing of the three-dimensional shaped object is performed when the shaping material is further discharged onto the existing layer to shape the three-dimensional shaped object. The existing layer refers to a layer that is already formed by stacking the shaping material discharged from the nozzle 61 before performing the shaping processing. In the present embodiment, the control unit 500 executes a shaping program for creating the three-dimensional shaped object to shape the three-dimensional shaped object.

In step S110, the control unit 500 acquires shaping data used for shaping the three-dimensional shaped object. The shaping data is, for example, tool path data created by converting data in STL format or AMF format indicating a shape of the three-dimensional shaped object with a slicer. The shaping data acquired here may be data for shaping one layer, or may be data for shaping a plurality of layers.

In step S120, the control unit 500 determines the moving direction of the nozzle 61 based on the shaping data.

In step S130, the control unit 500 determines a blowing direction according to the moving direction of the nozzle 61 determined in step S120, and blows the warm air from the air outlets 140 based on the determined blowing direction. Determining the blowing direction refers to determining the blown air amount of the warm air to be blown from each of the air outlets 140. Specifically, the control unit 500 controls the adjusting valves 150, so that a front side blown air amount from the air outlet 140 located in a front side of the nozzle 61 in the moving direction of the nozzle 61 is set to be larger than a rear side blown air amount from the air outlet 140 located in a rear side of the nozzle 61 in the moving direction of the nozzle 61. For example, as shown by an arrow in FIG. 3, when the nozzle 61 moves in the +X direction, the control unit 500 controls the adjusting valves 150, so that a sum of the blown air amounts of the first air outlet 141, the second air outlet 142 and the eighth air outlet 148 is set to be larger than a sum of the blown air amounts of the fourth air outlet 144, the fifth air outlet 145, and the sixth air outlet 146. In this case, the front side blown air amount can be set larger than the rear side blown air amount by blowing the warm air only from the first air outlet 141 and stopping blowing the warm air from other air outlets 140. When the blown air amounts of the third air outlet 143 and the seventh air outlet 147 on a dashed line that is located in a manner aligned laterally with the nozzle 61 with respect to the moving direction are changed, both the front side blown air amount and the rear side blown air amount change as well. Therefore, the change in the blown air amount of the third air outlet 143 and the seventh air outlet 147 does not affect a magnitude relationship between the front side blown air amount and the rear side blown air amount.

In step S140, the control unit 500 moves the nozzle 61 in the moving direction determined in step S130, and meanwhile controls the nozzle 61 to discharge the shaping material generated by the melting unit 30. That is, as the nozzle 61 moves, the warm air is blown from the air outlet 140, and the shaping material is discharged from the nozzle 61. Since the shaping material is discharged to a portion of the existing layer heated by the warm air in step S140, adhesion between the discharged shaping material and the existing layer is improved.

In step S150, the control unit 500 determines whether or not to change the moving direction of the nozzle 61 based on the shaping data. When the moving direction of the nozzle changes, a new moving direction of the nozzle 61 is determined again in step S120.

When the direction is not changed in step S150, the control unit 500 determines whether or not to the shaping of the three-dimensional shaped object is completed in step S160. When the shaping is not completed, the processing returns to step S110 again.

The three-dimensional shaping device 100 of this embodiment described above includes the air blowing unit 130 having the plurality of air outlets 140 that blows the warm air provided around the nozzle 61. As a result, a wide range around the nozzle 61 can be heated, as compared with a case where only one air outlet 140 is provided. Therefore, a front of the nozzle 61 in the moving direction can be efficiently heated by simple control without moving the air outlet 140 with respect to the nozzle 61.

Further, in the present embodiment, the air outlets 140 are disposed around the nozzle 61 at the regular intervals. As a result, the warm air can be evenly blown around the nozzle 61. Therefore, the front of the nozzle 61 in the moving direction can be efficiently heated under a simple control without moving the air outlet 140 with respect to the nozzle 61.

In addition, in the present embodiment, the adjusting valve 150 is provided for each air outlet 140. Therefore, the blown air amounts of the plurality of air outlets 140 can be individually adjusted according to the moving direction of the nozzle 61 during shaping of the three-dimensional shaped object.

Further, in the present embodiment, the front side blown air amount is set to be larger than the rear side blown air amount. Therefore, since when, for example, the three-dimensional shaped object is shaped by further discharging the shaping material onto the existing layer, the shaping material is discharged to a front portion of the existing layer in the moving direction, which is heated by the warm air having a larger blown air amount than that of a rear portion of the existing layer in the moving direction of the nozzle 61, the adhesion between the discharged shaping material and the existing layer is improved.

Further, in the present embodiment, the annular flow path 135 that communicates with the air outlets 140 and supplies the warm air to the air outlets 140 is provided. Therefore, the warm air can be supplied to the plurality of air outlets 140 provided around the nozzle 61 with a simple configuration.

Further, in the present embodiment, the heat insulating portion 98 is provided between the nozzle 61 and the annular flow path 135. Therefore, the shaping material in the nozzle 61 can be prevented from being thermally influenced by the warm air in the annular flow path 135.

Further, in the present embodiment, the flat screw 40 and the barrel 50 are provided as the melting unit 30. Therefore, the three-dimensional shaping device 100 as a whole can be miniaturized with the air blowing unit 130 included therein.

Further, in the present embodiment, the heater 58 heats the barrel 50 and the warm air supply flow path 95. Therefore, the barrel 50 and the warm air supply flow path 95 can be heated with a simple configuration.

Here, the material of the three-dimensional shaped object used in the three-dimensional shaping device 100 described above will be described. The three-dimensional shaping device 100 can use various materials such as a material having thermoplasticity, a metal material, and a ceramic material as a main material to shape the three-dimensional shaped object. Here, the "main material" refers to a central material for forming a shape of the three-dimensional shaped object, and a material occupying a content of 50% by weight or more in the three-dimensional shaped object. The above shaping materials include those in which main materials are melted alone, and those in which some of the components contained together with the main materials are melted to form a paste.

When the material having thermoplasticity is used as the main material, the shaping material is generated by plasticizing the material in the melting unit 30. The term "plasticize" refers to that the material having thermoplasticity is heated and melted.

For example, the following thermoplastic resin materials can be used as the material having thermoplasticity.

Example of Thermoplastic Resin Material

General-purpose engineering plastic such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyether ether ketone An additive such as a wax, a flame retardant, an antioxidant, and a heat stabilizer in addition to a pigment, a metal, and a ceramic may be mixed to the material having thermoplasticity. The material having thermoplasticity is plasticized by the rotation of the flat screw 40 and the heating of the heater 58 and is then converted into a melted state in the melting unit 30. After the shaping material generated by melting the material having thermoplasticity is discharged from the nozzle 61, the shaping material is cured due to a reduction in temperature.

It is desirable that the material having thermoplasticity is injected from the nozzle 61 in a state where the material is heated to the temperature equal to or higher than the glass transition point thereof, and then is in a completely melted state. For example, a glass transition point of the ABS resin is about 120° C., and it is desirable that the ABS resin is discharged from the nozzle 61 at about 200° C.

The following metal materials, for example, may be used as the main material in the three-dimensional shaping device 100 instead of the above material having thermoplasticity. In this case, it is desirable that a component to be melted at the time of generating the shaping material is mixed with a powder material obtained by converting the following metal material into powder, and then the mixture is charged into the melting unit 30 as the material MR.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy The ceramic material may be used as the main material in the three-dimensional shaping device 100 instead of the above metal material. As the ceramic material, for example, oxide ceramics such as silicon dioxide, titanium dioxide, aluminum oxide, and zirconium oxide, and non-oxide ceramics such as aluminum nitride can be used. When the metal material or the ceramic material as described above is used as the main material, the shaping material discharged onto the shaping surface 310 may be cured by sintering.

A powder material of the metal material or the ceramic material charged into the material supply unit 20 as the material MR may be a mixed material obtained by mixing a plurality of types of powder including single metal powder, alloy powder, and ceramic material powder. The powder material of the metal material or the ceramic material may be coated with, for example, the thermoplastic resin shown above or another thermoplastic resin. In this case, the thermoplastic resin may be melted in the melting unit 30 to exhibit the fluidity.

For example, the following solvents can be added to the powder material of the metal material or the ceramic material charged into the material supply unit 20 as the material MR. The solvent can be used alone or in combination of two or more selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged into the material supply unit 20 as the material MR.

Example of Binder

Figure 7:
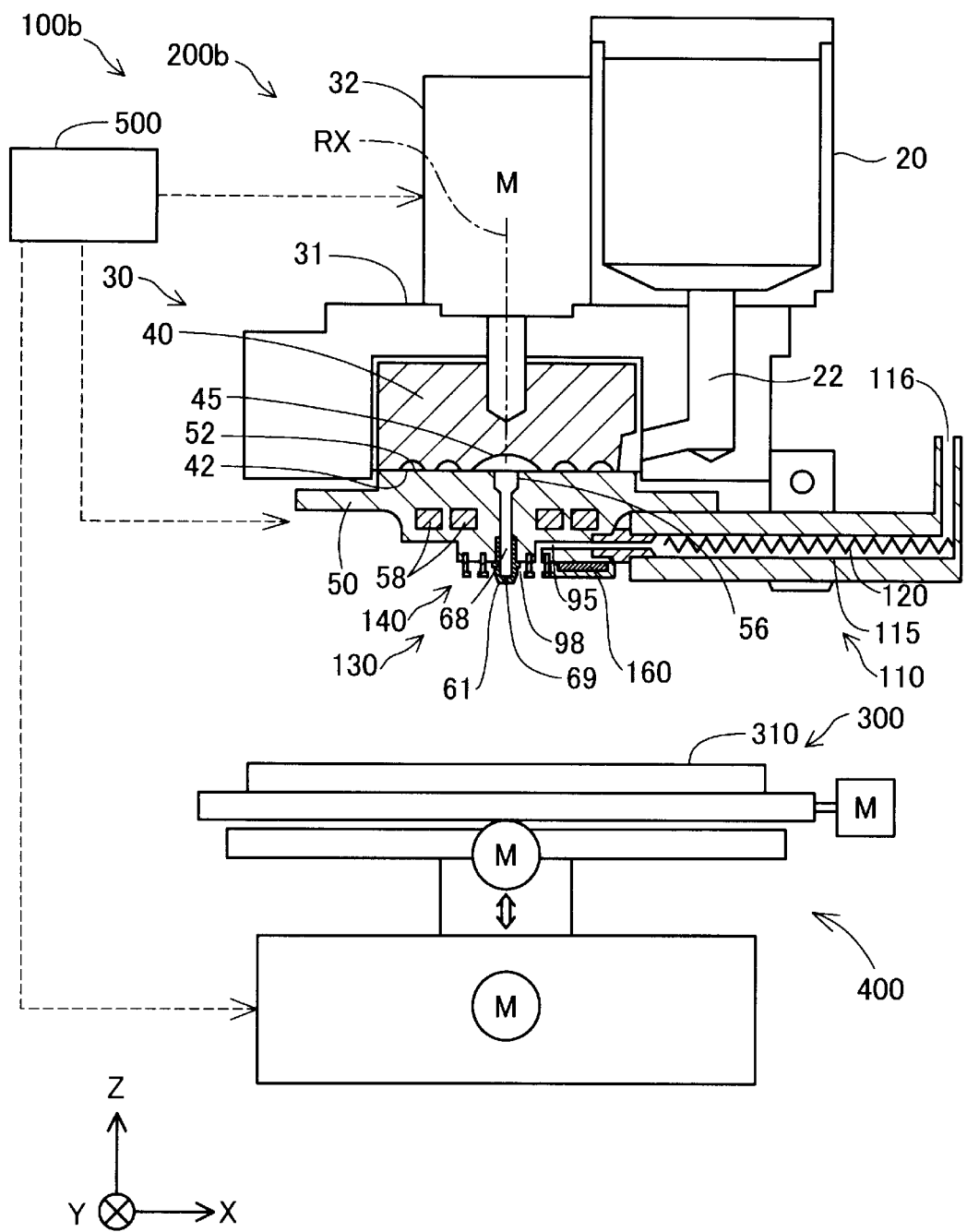
FIG. 7 is a schematic cross-sectional view showing a configuration of a three-dimensional shaping device according to a second embodiment.

Acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins B. Second Embodiment FIG. 7 is a schematic cross-sectional view showing a configuration of a three-dimensional shaping device 100b according to the second embodiment. A part of the three-dimensional shaping device 100b according to the second embodiment that is not particularly described has a configuration same as that of the three-dimensional shaping device 100 according to the first embodiment.

A shaping unit 200b of the present embodiment includes a second heating unit 160 that heats the warm air supply flow path 95. The second heating unit 160 is a rod-shaped heater. The second heating unit 160 is disposed on the lower surface of the barrel 50 along the X direction.

The control unit 500 can separately control the heater 58, which is the first heating unit, and the second heating unit 160. For example, by controlling the heater 58, a temperature of the barrel 50 is adjusted to a temperature suitable for exhibiting plasticity of the shaping material, and meanwhile, by controlling the second heating unit 160, the warm air supply flow path 95 is heated, and a temperature of the warm air supplied to the air blowing unit 130 can be increased.

With such a configuration of the three-dimensional shaping device 100b as well, under a simple control, the three-dimensional shaped object can be shaped while a position corresponding to the moving direction of the nozzle 61 is heated. In particular, in the present embodiment, the temperature of the warm air supplied to the air blowing unit 130 can be adjusted by controlling the second heating unit.

C. Third Embodiment

Figure 8:
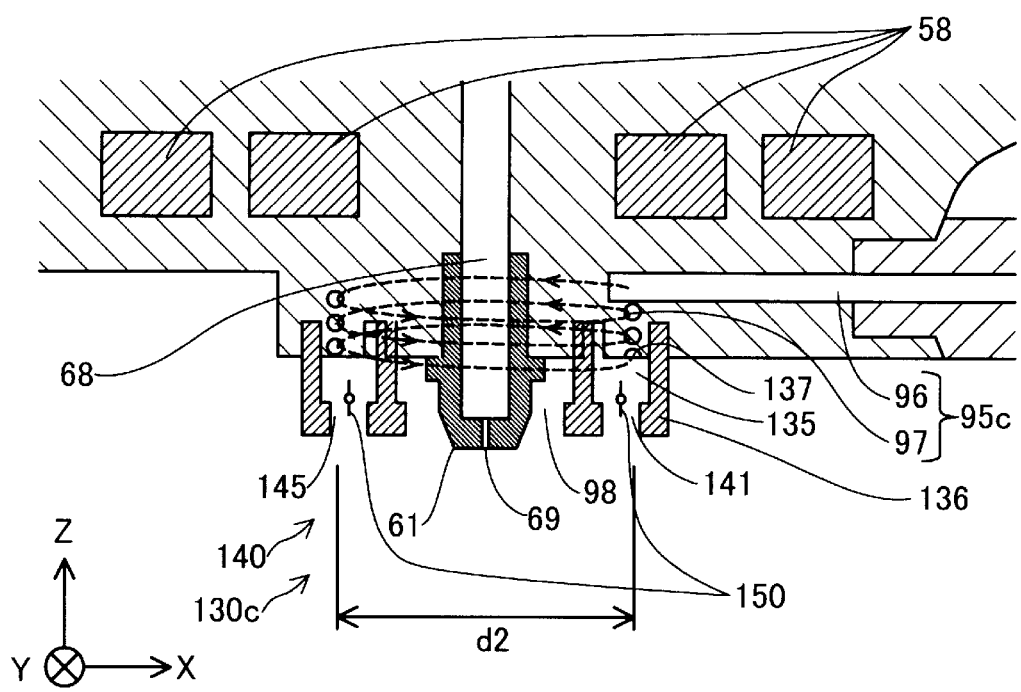
FIG. 8 is an explanatory diagram showing a schematic configuration of an air blowing unit according to a third embodiment.

FIG. 8 is an explanatory diagram showing a schematic configuration of an air blowing unit 130c according to the third embodiment. Since a configuration of a three-dimensional shaping device 100c other than the air blowing unit 130c in the third embodiment is similar to that of the first embodiment, a description thereof is omitted. Further, a part of the air blowing unit 130c not particularly described has a configuration similar to that of the air blowing unit 130 of the first embodiment.

In the present embodiment, the warm air supply flow channel 95c has a straight flow path 96 and a spiral flow path 97. The straight flow path 96 is a flow path that is coupled to the gas pipe 115 of the warm air generating unit 110 and extends in the −X direction from a side surface of the barrel 50 to an inside of the barrel 50. The spiral flow path 97 is a spiral flow path that extends vertically downward in the barrel 50 with the nozzle 61 as the center. A start end of the spiral flow path 97 is coupled to one end of the straight flow path 96. Further, a terminal end of the spiral flow path 97 is coupled to the warm air supply port 137.

In the present embodiment, a total length of the warm air supply flow path 95c in the barrel 50 is longer than a length of an outer periphery of the barrel 50. The outer periphery of the barrel 50 refers to an outer periphery of the screw facing surface 52 shown in FIG. 5. Further, in the present embodiment, the total length of the warm air supply flow path 95c is a sum of a length of the straight flow path 96 and a length of the spiral flow path 97.

As shown in FIG. 5, the screw facing surface 52 has the substantially circular shape with the diameter d1. On the other hand, the spiral flow path 97 is a spiral flow path having a circular shape with the nozzle 61 as the center and having a diameter d2 when viewed from the +Z direction. The diameter d2 is one-third the length of the diameter d1. Further, the spiral flow path 97 is formed in three rounds around the nozzle 61 from the start end to the terminal end. Therefore, the total length of the warm air supply flow path 95c is longer than the length of the outer periphery of the barrel 50.

Note that the warm air supply flow path 95c is not the spiral flow path, and may be, for example, a flow path having a total length longer than the length of the outer periphery of the barrel 50 by changing a direction in the barrel 50 a plurality of times. Further, a part of the warm air supply flow path 95c may be provided outside the barrel 50. That is, at least a part of the warm air supply flow path 95c may be provided in the barrel 50.

With such a configuration of the three-dimensional shaping device 100c as well, under a simple control, the three-dimensional shaped object can be shaped while a position corresponding to the moving direction of the nozzle 61 is heated. In particular, in the present embodiment, as compared with a case where the total length of the warm air supply flow path 95c provided in the barrel 50 is not more than the length of the outer periphery of the barrel 50, air in the warm air supply flow path 95c is heated by the heater 58 for a long time. Therefore, the air in the warm air supply flow path 95 can be effectively heated by the heater 58.

D. Other Embodiments (D-1) In the embodiments described above, the air blowing unit 130 has eight air outlets. On the other hand, the number of air outlets may be two or more and seven or less, or nine or more.

(D-2) In the embodiments described above, the plurality of air outlets 140 are disposed on the circumference with the nozzle 61 as the center. On the other hand, the air outlets 140 may be disposed, for example, on a circumference of an ellipse with the nozzle 61 as the center. Further, the air outlets 140 may be disposed on sides of a polygon with the nozzle 61 as the center.

(D-3) In the embodiments described above, the plurality of air outlets 140 are disposed around the nozzle 61 at the regular intervals. On the other hand, the air outlets 140 may not be disposed at the regular intervals. For example, an angle between straight lines linking the nozzle 61 and each air outlet 140 may be constant. In addition, for example, the air outlets 140 of the above-described embodiments may not have the third air outlet 143 and the seventh air outlet 147.

(D-4) In the embodiments described above, the control unit 500 sets the front side blown air amount to be larger than the rear side blown air amount. On the other hand, the blown air amount may not be adjusted according to the moving direction of the nozzle 61, and the warm air with the same blown air amount may be blown from all the air outlets 140. Further, the rear side blown air amount may be larger than the front side blown air amount.

(D-5) In the embodiments described above, the heat insulating portion 98 is provided between the nozzle 61 and the annular flow path 135. On the other hand, the heat insulating portion 98 may not be provided between the nozzle 61 and the annular flow path 135.

(D-6) In the embodiments described above, the annular flow path 135 and the warm air supply port 137 are provided. On the other hand, the annular flow path 135 and the warm air supply port 137 may not be provided, but flow paths branching from the warm air supply flow path 95 to each of the air outlets 140 may be provided.

(D-7) In the embodiments described above, a flow rate sensor that measures the flow rate of the warm air may be provided at each of the air outlets 140. In addition, a temperature sensor such as a thermocouple that measures the temperature of the warm air may be provided at each air outlet 140. In this case, the control unit 500 may adjust the flow rate or the temperature of the warm air blown from each of the air outlets 140 according to a value measured by the flow rate sensor or the temperature sensor.

(D-8) In the embodiments described above, the adjusting valve 150 is provided at each of the air outlets 140 as the blown air amount adjusting mechanism. On the other hand, for example, the adjusting valve 150 may be provided in a flow path that supplies the warm air to each of the air outlets 140. Further, a mechanism that adjusts a blown air amount of the entire air blowing unit 130, instead of the blown air amount of each air outlet 140, may be provided. Further, the mechanism that adjusts the blown air amount may not be provided.

(D-9) In the embodiments described above, the melting unit 30 includes the flat screw 40, the barrel 50, and the heater 58. On the other hand, the melting unit 30 may not include the flat screw 40, the barrel 50, and the heater 58, and may include, for example, an inline screw.

(D-10) In the embodiments described above, the heater 58 heats the barrel 50 and the warm air supply flow path 95. On the other hand, the heater 58 may not heat the warm air supply flow path 95. For example, the heater 58 may be provided inside the barrel 50, and the warm air supply flow path 95 may be provided outside the barrel 50, such that the heater 58 heats the barrel 50 and does not heat the warm air supply flow path 95.

(D-11) In the embodiments described above, the heater 58 is provided inside the barrel 50. On the other hand, the heater 58 may be provided outside the barrel 50.

(D-12) In the embodiments described above, the warm air generating unit 110 is provided. On the other hand, the warm air generating unit 110 may not be provided. For example, the inert gas introduced into the warm air supply flow path 95 may be heated by the heater 58, and the heated inert gas may be supplied to the air blowing unit 130.

E. Other Aspects

The present disclosure is not limited to the embodiments described above, and can be implemented in various forms without departing from the scope of the present disclosure. For example, the present disclosure can be implemented as the following forms. In order to solve some or all of the problems described in the present disclosure, or to achieve some or all of the effects of the present disclosure, technical features of the embodiments described above corresponding to technical features to be described below of the embodiments can be replaced or combined as appropriate. In addition, unless described as essential in this description, the technical features can be deleted as appropriate.

(1) According to a first aspect of the present disclosure, a three-dimensional shaping device is provided. The three-dimensional shaping device includes: a melting unit configured to plasticize a material into a shaping material; a nozzle configured to discharge the shaping material toward a stage; a moving mechanism configured to change a relative position between the nozzle and the stage; a control unit configured to control the moving mechanism; and an air blowing unit having a plurality of air outlets that are disposed around the nozzle and through which warm air is blown toward the shaping material discharged from the nozzle.

According to this aspect, a wide range around the nozzle can be heated, as compared with a case where only one air outlet is provided. Therefore, a front of the nozzle in the moving direction can be efficiently heated under a simple control without moving the air outlets with respect to the nozzle.

(2) In the three-dimensional shaping device according to the aspect described above, the air outlet may be disposed around the nozzle at regular intervals. According to this aspect, the warm air can be evenly blown around the nozzle. Therefore, a front of the nozzle in the moving direction can be efficiently heated under a simple control without moving the air outlets with respect to the nozzle.

(3) The three-dimensional shaping device according to the aspect described above may further include a blown air amount adjusting mechanism configured to adjust a blown air amount of the warm air for each of the air outlets. According to this aspect, blown air amounts of the plurality of air outlets can be individually adjusted according to the moving direction of the nozzle at the time of shaping of the three-dimensional shaped object.

(4) In the three-dimensional shaping device according to the aspect described above, the control unit may control the blown air amount adjusting mechanism such that the blown air amount from the air outlet located in a front side of the nozzle in the moving direction of the nozzle is set to be larger than the blown air amount from the air outlet located in a rear side of the nozzle in the moving direction of the nozzle. According to this aspect, when the three-dimensional shaped object is shaped by further discharging the shaping material onto an existing layer, the shaping material is discharged to a front portion of the existing layer in the moving direction, which is heated by the warm air having a larger blown air amount than that of a rear portion of the existing layer in the moving direction of the nozzle, so that adhesion between the discharged shaping material and the existing layer is improved.

(5) In the three-dimensional shaping device according to the aspect described above, the air blowing unit may include: an annular flow path that is an annular flow path centered on the nozzle and communicates with the air outlets to supply the warm air to the air outlets; and a warm air supply port through which the warm air is supplied to the annular flow path. According to this aspect, the warm air can be supplied to the plurality of air outlets provided around the nozzle with a simple configuration.

(6) The three-dimensional shaping device according to the aspect described above may further include a heat insulating portion provided between the nozzle and the annular flow path. According to this aspect, the shaping material in the nozzle can be prevented from being thermally influenced by the warm air in the annular flow path.

(7) In the three-dimensional shaping device according to the aspect described above, the melting unit may include: a flat screw having a groove forming surface on which a groove to which the material is supplied is formed; and a barrel having a facing surface that faces the groove forming surface, and provided with a communication hole that communicates the facing surface and the nozzle, and a first heating unit configured to heat the barrel may be further provided. According to this aspect, the three-dimensional shaping device as a whole can be miniaturized with the air blowing unit included therein.

(8) The three-dimensional shaping device according to the aspect described above may further include a warm air supply flow path configured to supply the warm air to the air blowing unit, and the first heating unit heats the barrel and the warm air supply flow path. According to this aspect, the barrel and the warm air supply flow path can be heated with a simple configuration.

(9) The three-dimensional shaping device according to the aspect described above may further include a second heating unit configured to heat the warm air supply flow path. According to this aspect, a temperature of warm air supplied to the air blowing unit can be adjusted by controlling the second heating unit.

(10) In the three-dimensional shaping device according to the aspect described above, at least a part of the warm air supply flow path is provided in the barrel, and a total length of the warm air supply flow path provided in the barrel may be longer than a length of an outer periphery of the barrel. According to this aspect, as compared with a case where the total length of the warm air supply flow path provided in the barrel is not more than the length of the outer periphery of the barrel, an inert gas in the warm air supply flow path is heated by the first heating unit for a long time, so that the inert gas in the warm air supply flow path can be effectively heated by the first heating unit.

The present disclosure is not limited to the three-dimensional shaping device described above, and can be implemented in various modes. For example, the present disclosure can be implemented in an aspect of a method for manufacturing a three-dimensional shaped object, a method for controlling a three-dimensional shaping device, a computer program for shaping a three-dimensional shaped object, and a non-transitory tangible recording medium in which the computer program is recorded.

What is claimed is:

1. A three-dimensional shaping device, comprising:
a melting unit configured to plasticize a material into a shaping material;
a nozzle configured to discharge the shaping material toward a stage;
a moving mechanism configured to change a relative position between the nozzle and the stage;
a control unit configured to control the moving mechanism; and
an air blowing unit having a plurality of air outlets that are disposed around the nozzle and through which air is blown toward the shaping material discharged from the nozzle, the air blowing unit includes:
an annular flow path that is an annular flow path centered on the nozzle and communicates with the air outlets to supply the air to the air outlets;
an air supply port through which the air is supplied to the annular flow path; and
a heat insulating portion provided between the nozzle and the annular flow path.

2. The three-dimensional shaping device according to claim 1, wherein the air outlets are disposed around the nozzle at regular intervals.

3. The three-dimensional shaping device according to claim 1, further comprising:
a blown air amount adjusting mechanism configured to adjust a blown air amount of the air for each of the air outlets.

4. The three-dimensional shaping device according to claim 3, wherein
the control unit controls the blown air amount adjusting mechanism such that the blown air amount from the air outlet located in a front side of the nozzle in a moving direction of the nozzle is set to be larger than the blown air amount from the air outlet located in a rear side of the nozzle in the moving direction of the nozzle.

5. The three-dimensional shaping device according to claim 1, wherein the melting unit includes:
a flat screw having a groove forming surface on which a groove to which the material is supplied is formed; and
a barrel having a facing surface that faces the groove forming surface, and provided with a communication hole that communicates the facing surface and the nozzle, and
a first heating unit configured to heat the barrel is further provided.

6. The three-dimensional shaping device according to claim 5, further comprising:
an air supply flow path configured to supply the air to the air blowing unit, wherein
the first heating unit heats the barrel and the air supply flow path.

7. The three-dimensional shaping device according to claim 6, further comprising:
a second heating unit configured to heat the air supply flow path.

8. The three-dimensional shaping device according to claim 6, wherein
at least a part of the air supply flow path is provided in the barrel, and
a total length of the air supply flow path provided in the barrel is longer than a length of an outer periphery of the barrel.

9. A three-dimensional shaping device, comprising:
a melting unit configured to plasticize a material into a shaping material, the melting unit including:
a flat screw having a groove forming surface on which a groove to which the material is supplied is formed;
a barrel having a facing surface that faces the groove forming surface, and provided with a communication hole; and
a first heating unit configured to heat the barrel;
a nozzle configured to discharge the shaping material toward a stage, the nozzle communicates with the facing surface through the communication hole;
a moving mechanism configured to change a relative position between the nozzle and the stage;
a control unit configured to control the moving mechanism;
an air blowing unit having a plurality of air outlets that are disposed around the nozzle and through which air is blown toward the shaping material discharged from the nozzle; and
an air supply flow path configured to supply the air to the air blowing unit, wherein
the first heating unit heats the barrel and the air supply flow path,
at least a part of the air supply flow path is provided in the barrel, and
a total length of the air supply flow path provided in the barrel is longer than a length of an outer periphery of the barrel.

* * * * *